United States Patent
Chung et al.

(10) Patent No.: US 9,336,952 B2
(45) Date of Patent: May 10, 2016

(54) MULTILAYER CERAMIC ELECTRONIC PART AND METHOD OF MANUFACTURING THE SAME

(71) Applicant: SAMSUNG ELECTRO-MECHANICS CO., LTD., Suwon-Si, Gyeonggi-Do (KR)

(72) Inventors: Hae Sock Chung, Suwon-Si (KR); Doo Young Kim, Suwon-Si (KR); Na Rim Ha, Suwon-Si (KR); Chang Hoon Kim, Suwon-Si (KR); Kyung Pyo Hong, Suwon-Si (KR); Sang Hyun Park, Suwon-Si (KR)

(73) Assignee: SAMSUNG ELECTRO-MECANICS CO., LTD., Suwon-Si, Gyeonggi-Do (KR)

( * ) Notice: Subject to any disclaimer, the term of this patent is extended or adjusted under 35 U.S.C. 154(b) by 245 days.

(21) Appl. No.: 14/209,416

(22) Filed: Mar. 13, 2014

(65) Prior Publication Data

US 2015/0077898 A1 Mar. 19, 2015

(30) Foreign Application Priority Data

Sep. 17, 2013 (KR) ........................ 10-2013-0111707

(51) Int. Cl.
 H01G 4/30 (2006.01)
 H01G 4/232 (2006.01)
 H01G 4/224 (2006.01)
 H01G 2/10 (2006.01)
 H01G 4/12 (2006.01)

(52) U.S. Cl.
 CPC ................. *H01G 4/30* (2013.01); *H01G 4/232* (2013.01); *H01G 4/2325* (2013.01); *H01G 2/10* (2013.01); *H01G 4/12* (2013.01); *H01G 4/224* (2013.01)

(58) Field of Classification Search
 CPC ............ H01G 4/30; H01G 2/10; H01G 4/224
 See application file for complete search history.

(56) References Cited

U.S. PATENT DOCUMENTS

| | | | |
|---|---|---|---|
| 5,734,000 A | 3/1998 | Popall | |
| 6,535,105 B2 | 3/2003 | Heistand | |
| 2011/0299221 A1* | 12/2011 | Higashi | H01C 1/142 |
| | | | 361/305 |
| 2012/0120547 A1* | 5/2012 | Ro | H01G 4/232 |
| | | | 361/321.3 |
| 2013/0170095 A1* | 7/2013 | Oh | H01G 4/008 |
| | | | 361/305 |

FOREIGN PATENT DOCUMENTS

| | | |
|---|---|---|
| KR | 10-2009-0083124 A | 8/2009 |
| KR | 2012-0083725 A | 7/2012 |

* cited by examiner

*Primary Examiner* — Dion R Ferguson
(74) *Attorney, Agent, or Firm* — McDermott Will & Emery LLP

(57) ABSTRACT

There is provided a multilayer ceramic capacitor including a ceramic body including a plurality of dielectric layers, a plurality of first and second internal electrodes disposed in the ceramic body to be alternately exposed to first and second end surfaces of the ceramic body, having the dielectric layer therebetween, first and second electrode layers electrically connected to the first and second internal electrodes, respectively, a conductive resin layer formed on the first and second electrode layers and in regions of the ceramic body adjacent to the first and second electrode layers, and a coating layer formed between a portion of an outer surface of the ceramic body on which the conductive resin layer is to be formed and the conductive resin layer.

12 Claims, 2 Drawing Sheets

A-A'

MULTILAYER CERAMIC ELECTRONIC PART AND METHOD OF MANUFACTURING THE SAME

CROSS-REFERENCE TO RELATED APPLICATION

This application claims the benefit of Korean Patent Application No. 10-2013-0111707 filed on Sep. 17, 2013, with the Korean Intellectual Property Office, the disclosure of which is incorporated herein by reference.

BACKGROUND

The present disclosure relates to a multilayer ceramic electronic part and a method of manufacturing the same.

As electronic products have been miniaturized, various electronic parts have been miniaturized in the form of chips. For example, in the case of small sized capacitors formed of a ceramic material, external electrodes having a predetermined width are formed on both end portions of chip shaped bodies formed of a ceramic material.

Generally, as a method of manufacturing external electrodes, for convenience of a process of manufacturing external electrodes, a method of dipping one ends of chip bodies into a paste to be applied thereto is mainly used. Thereafter, in order to allow the paste to be formed in the form of an electrode, thermal treatment is rapidly performed on the paste, thereby curing the paste.

In this case, during a process of applying and drying the paste, a phenomenon in which a relatively large amount of an external electrode paste may flow toward the chip bodies from a middle portion of the paste in a half moon shape may occur.

When band widths of external electrodes, formed due to the flow of the external electrode paste toward the chip bodies, are excessively large, appearance defects, standard defects, pick-up defects, tombstone defects, or the like, may occur. When the bandwidths of the external electrodes are excessively small, warpage, adhesion strength shortage defects, or the like, may occur. Further, in the case in which band widths of the external electrodes are asymmetric to each other, the above-mentioned defects may further become more severe.

In addition, when deviations in the band widths of external electrodes are not uniform, reproducibility of electric properties may not be obtained. Therefore, external electrodes should be formed to have a uniform band width.

RELATED ART DOCUMENT (Patent Document 1) Korean Patent Laid-Open Publication No. 2012-0083725
(Patent Document 2) Korean Patent Laid-Open Publication No. 2009-0083124

SUMMARY

An aspect of the present disclosure may provide a multilayer ceramic electronic part and a method of manufacturing the same.

According to an aspect of the present disclosure, a multilayer ceramic capacitor may include: a ceramic body including a plurality of dielectric layers; a plurality of first and second internal electrodes disposed in the ceramic body to be alternately exposed to first and second end surfaces of the ceramic body, having the dielectric layer therebetween; first and second electrode layers electrically connected to the first and second internal electrodes, respectively; a conductive resin layer formed on the first and second electrode layers and in regions of the ceramic body adjacent to the first and second electrode layers; and a coating layer formed between a portion of an outer surface of the ceramic body on which the conductive resin layer is to be formed and the conductive resin layer.

The coating layer may contain silicon and fluorine.
The coating layer may contain 0.5 to 45 parts by mole of the silicon, based on 100 parts by mole of the fluorine.
The coating layer may contain at least one of silicon or silicon compounds and at least one of fluorine or fluorine compounds.
The conductive resin layer may contain a conductive metal and a thermosetting resin.
The thermosetting resin may include an epoxy resin.

According to another aspect of the present disclosure, a multilayer ceramic electronic part may include: a ceramic body including dielectric layers and internal electrodes; an electrode layer electrically connected to the internal electrode; a surface energy decreasing layer formed on a surface of the ceramic body; and a conductive resin layer formed on the electrode layer and the surface energy deceasing layer.

The surface energy decreasing layer may contain silicon and fluorine.

According to another aspect of the present disclosure, a method of manufacturing a multilayer ceramic electronic part may include: preparing a ceramic body including dielectric layers and internal electrodes; preparing an electrode layer electrically connected to the internal electrode; forming a coating layer on a surface of the ceramic body; applying a conductive resin paste to the electrode layer and the coating layer; and curing the conductive resin paste to form a conductive resin layer.

The coating layer may contain silicon and fluorine.
The coating layer may contain 0.5 to 45 parts by mole of the silicon, based on 100 parts by mole of the fluorine.
The coating layer may be coated on the surface of the ceramic body by a plasma coating process.
The plasma coating process may include a plasma treating process and a plasma polymerization process.
The conductive resin layer may contain a conductive metal and a thermosetting resin.
The thermosetting resin may include an epoxy resin.
The conductive resin layer may be formed by curing the conductive resin paste at a temperature lower than 300° C.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
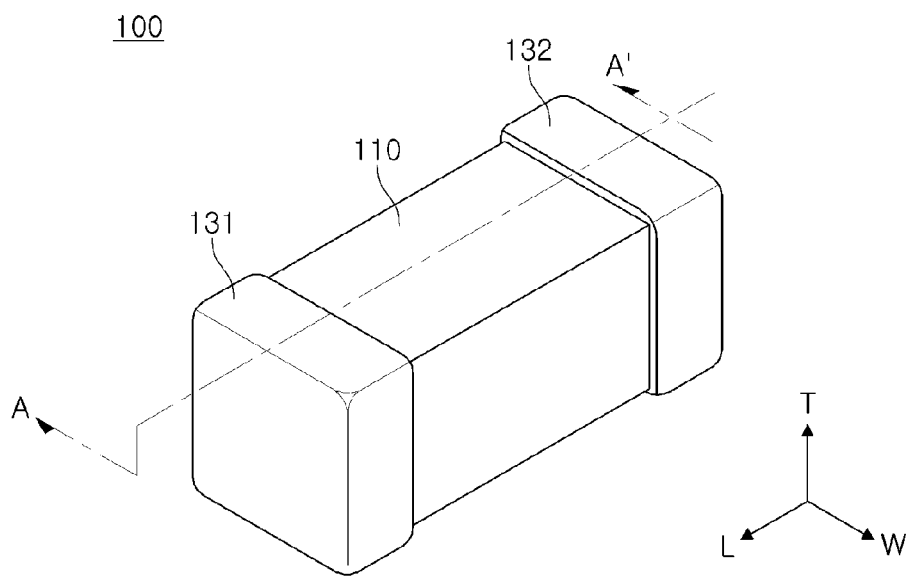
FIG. 1 is a perspective view showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a perspective view showing a multilayer ceramic capacitor according to an exemplary embodiment of the present disclosure.

Figure 2:
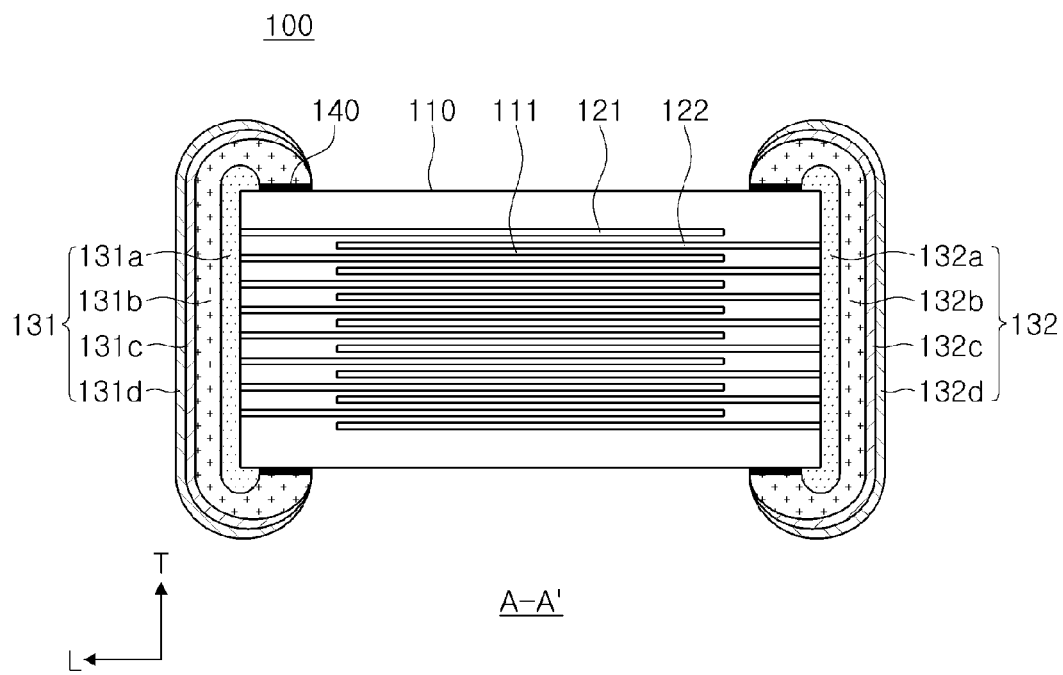
FIG. 2 is a cross-sectional view taken along line A-A' of FIG. 1.

FIG. 2 is a cross-sectional view taken along line A-A' of FIG. 1.

Figure 3:
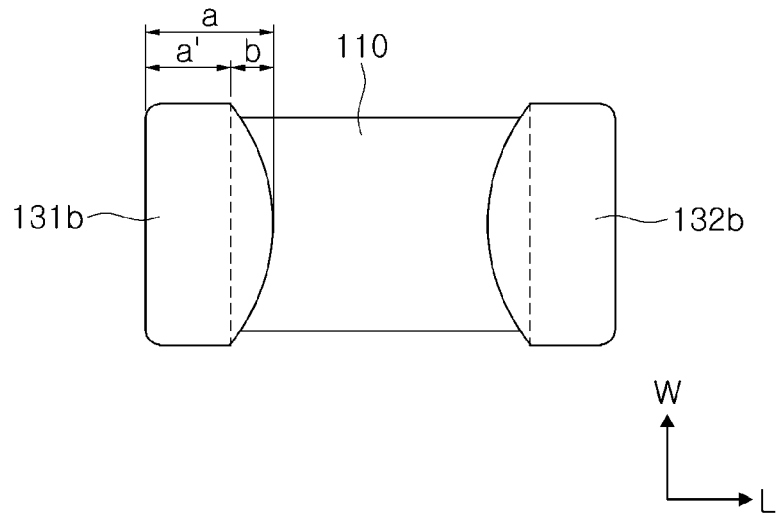
FIG. 3 is a plan view for explaining a band shape of an external electrode of the multilayer ceramic capacitor.

FIG. 3 is a plan view for explaining a band shape of an external electrode of the multilayer ceramic capacitor.

Referring to FIGS. 1 and 2, the multilayer ceramic capacitor 100 according to an exemplary embodiment of the present disclosure may include a ceramic body 110, and first and second external electrodes 131 and 132.

The ceramic body 110 may include an active layer as a part contributing to forming capacitance of the capacitor and upper and lower cover layers formed on upper and lower portions of the active layer as upper and lower margin parts, respectively. The active layer may include dielectric layers 111 and internal electrodes 121 and 122, wherein a plurality of the first and second internal electrodes 121 and 122 may be alternately formed, having the dielectric layer 111 therebetween.

In an exemplary embodiment of the present disclosure, a shape of the ceramic body 110 is not particularly limited, but may be substantially a hexahedral shape. A difference in a thickness is generated according to the sintering shrinkage of ceramic powder at the time of sintering a chip and the presence or absence of an internal electrode pattern, and edge parts of the ceramic body is polished, such that the ceramic body 110 does not have a perfect hexahedral shape but may have a shape substantially close to a hexahedral shape.

Directions of a hexahedron will be defined to clearly describe the exemplary embodiments of the present disclosure. L, W and T shown in the accompanying drawings refer to a length direction, a width direction, and a thickness direction, respectively. Here, the thickness direction may be the same as a direction in which dielectric layers are stacked.

The ceramic body 110 may have first and second main surfaces opposing each other in the thickness direction, first and second side surfaces opposing each other in the width direction and connecting the first and second main surfaces to each other, and first and second end surfaces opposing each other in the length direction and connecting the first and second main surfaces to each other.

The internal electrode may be configured of the first and second internal electrodes 121 and 122. The first and second internal electrodes 121 and 122 may be disposed to face each other, having the dielectric layer 111 therebetween. The first and second internal electrodes 121 and 122, a pair of electrodes having different polarities from each other, may be formed by printing a conductive paste containing a conductive metal on the dielectric layer 111 to be a predetermined thickness, may be alternately formed to be exposed to both end surfaces of the ceramic body, in a direction in which the dielectric layers 111 are stacked, and may be electrically insulated from each other by the dielectric layer 111 disposed therebetween.

For example, the first and second internal electrodes 121 and 122 may be electrically connected to the first and second external electrodes 131 and 132 through portions of the internal electrodes alternately exposed to the both end surfaces of the ceramic body 110, respectively.

Therefore, when voltage is applied to the first and second external electrodes 131 and 132, electric charges are accumulated between the first and second internal electrodes 121 and 122 facing each other. In this case, capacitance of the multilayer ceramic capacitor 100 may be in proportion to an area of an overlapped region between the first and second internal electrodes 121 and 122.

A thickness of the first and second internal electrodes 121 and 122 may be determined according to the use thereof, and may be designed in consideration of a size of the ceramic body 110.

Further, the conductive metal contained in the first and second internal electrodes 121 and 122 may be nickel (Ni), copper (Cu), palladium (Pd), or an alloy thereof, but the present disclosure is not limited thereto.

In this case, a thickness of the dielectric layer 111 may be suitably determined according to a capacitance design of the multilayer ceramic capacitor.

Further, the dielectric layer 111 may contain ceramic powder having high permittivity, for example, barium titanate ($BaTiO_3$)-based powder or strontium titanate ($SrTiO_3$)-based powder, or the like, but the present disclosure is not limited thereto.

The upper and lower cover layers may have the same material and configuration as those of the dielectric layer 111 except that internal electrodes are not included in the upper and lower cover layers. The upper and lower cover layers may be formed by stacking a single, two or more dielectric layers on upper and lower surfaces of the active layer in a vertical direction, respectively, and may generally serve to prevent the first and second internal electrodes 121 and 122 from being damaged by physical or chemical stress.

The first external electrode 131 may be electrically connected to the first internal electrode 121, and the second external electrode 132 may be electrically connected to the second internal electrode 122. The first external electrode 131 may include a first electrode layer 131a and a conductive resin layer 131b, and may further include plating layers 131c and 131d on the conductive resin layer.

The second external electrode 132 may include a second electrode layer 132a and a conductive resin layer 132b, and may further include plating layers 132c and 132d on the conductive resin layer.

The plating layer may include nickel plating layers 131c and 132c and tin plating layers 131d and 132d, wherein the tin plating layer may be formed on the nickel plating layer.

The first and second electrode layers 131a and 132a may be directly connected to the first and second internal electrodes to secure electrical connection between the external electrodes and the internal electrodes.

The first and second electrode layers 131a and 132a may contain a conductive metal, wherein the conductive metal may be nickel (Ni), copper (Cu), palladium (Pd), gold (Au), or an alloy thereof, but the present disclosure is not limited thereto.

The first and second electrode layers 131a and 132a may be sintering-type electrodes formed by sintering of a paste containing a conductive metal.

The first and second electrode layers 131a and 132a may be formed on the first and second end surfaces of the ceramic body and be partially extended from the first and second end surfaces to portions of the first and second main surfaces and the first and second side surfaces. In this case, as long as electric connection can be secured between the first and second electrode layers and the first and second internal electrodes, widths of band parts of the electrode layers extended to portions of the first and second main surfaces and the first and second side surfaces may be relatively short.

The conductive resin layers 131b and 132b may be disposed on the first and second electrode layers 131a and 132a. For example, the conductive resin layer may be disposed on outer portions of the first and second electrode layers and be extended from the electrode layers formed on the first and second end surfaces of the ceramic body to portions of the first and second main surfaces and the first and second side surfaces.

The conductive resin layer may be formed to completely cover edges of the first and second electrode layers, and widths of band parts of the conductive resin layers extended to portions of the first and second main surfaces and the first and second side surfaces may be greater than those of the band parts of the electrode layers.

For example, the first and second conductive resin layers 131b and 132b may be formed to cover the first and second electrode layers 131a and 132a and portions of outer surfaces of the ceramic body, adjacent to the first and second electrode layers.

The conductive resins 131b and 132b may contain conductive powder and a base resin, wherein the base resin may include a thermosetting resin. The thermosetting resin may be an epoxy resin, but is not limited thereto.

A coating layer 140 may be formed in regions of the first and second main surfaces and the first and second side surfaces of the ceramic body in which the conductive resin layer is to be extended and formed. In other words, the coating layer 140 may be disposed between portions of the first and second main surfaces and the first and second side surfaces of the ceramic body to be covered with the conductive resin layer, and an inner surface of an extended portion of the conductive resin layer covering the ceramic body.

For example, the coating layer may be formed to cover portions of outer surfaces of the ceramic body, adjacent to the first and second electrode layers, and the conductive resin layers may extend to cover the coating layer and the first and second electrode layers to then be formed to be greater in width, as compared to a formation position of the coating layer and the first and second electrode layers on outer surfaces of the ceramic body.

The coating layer 140 may contain silicon and fluorine, and the coating layer 140 may contain 0.5 to 45 parts by mole of silicon therein, based on 100 parts by mole of fluorine.

The coating layer may contain silicon and fluorine in the form of a compound containing silicon and fluorine and may contain at least one of silicon or silicon compounds and at least one of fluorine or fluorine compounds, but is not limited thereto.

The coating layer 140 may be formed on the surface of the ceramic body to thereby decrease surface energy of the ceramic body. For example, the coating layer may be considered as a surface energy decreasing layer.

In the case of directly applying a conductive resin paste for forming the conductive resin layers 131b and 132b to the electrode layer by a dipping method after forming the first and second electrode layers, an amount of flow of the conductive resin paste having flowability may be increased from an edge of the ceramic body 110 toward a middle portion thereof, such that a phenomenon in which boundaries of the conductive resin layers 131 and 132 are formed to have a half moon shape may occur.

FIG. 3 is a plan view for explaining a band shape of a band part of an external electrode of the multilayer ceramic capacitor. Referring to FIG. 3, 'a' may refer to the entire band width of the conductive resin layer, and 'b' may refer to a width of a portion at which the conductive resin paste flows to thereby protrude in the half moon shape. 'a' may refer to a band width of the conductive resin layer according to an exemplary embodiment of the present disclosure.

The reason for why the band width of the conductive resin layer is not constantly formed is that surface energy on the edge portion and on the middle portion of the ceramic body 110 is not uniform and the surface energy is gradually increased toward the middle portion of the ceramic body.

As described above, the surface energy on the edge portion and the middle portion of the ceramic body 110 is not uniform, which may be due to a geometrical shape of the ceramic body 110 and a difference in sintering hysteresis due to this geometrical shape.

Since the surface energy of the ceramic body 110 is not uniform, a phenomenon in which the bandwidth of the conductive resin layer is not constantly formed occurs. Therefore, the coating layer 140 may be formed on the surface of the ceramic body 110 so that the surface energy of the ceramic body 110 may be uniform.

The non-uniformity phenomenon of the band width may be relatively severe at the time of applying the conductive resin paste for forming the conductive resin layer, since surface tension of the conductive resin paste is relatively small. According to the present disclosure, as a coating material for preventing flow of the conductive resin paste and the occurrence of non-uniform band width of the conductive resin layer, a material containing both of silicon and fluorine may be used.

As the coating material, a material capable of allowing surface energy of the coating layer 140 to be relatively small when the coating material is coated may be selected. In other words, surface tension of the coating material is smaller than that of a solvent in the conductive resin paste.

In this case, wettability of the conductive resin paste on the coating layer 140 may be decreased, and in the case in which wettability of the conductive resin paste on the coating layer is decreased, when the conductive resin paste is applied to the coating layer, the conductive resin paste only intends to remain on an applied portion, but does not arbitrarily spread on the coating layer.

In this case, the band widths a of the conductive resin layers 131b and 132b may be precisely adjusted, and the band width non-uniformity phenomenon may be prevented.

Further, the coating layer 140 according to the present disclosure may remain between the surface of the ceramic body and the conductive resin layer after curing the conductive resin paste to thereby improve adhesion force between the conductive resin layer and the ceramic body.

The conductive resin paste according to the present disclosure may contain a thermosetting resin, and the conductive resin layer may be formed by curing the conductive resin paste at a temperature lower than 300° C.

The coating layer treated in order to decrease surface energy of a ceramic body may be removed at the time of performing a thermal treatment at a temperature higher than about 300° C., but the conductive resin layers 131b and 132b according to the present disclosure may be formed by thermosetting without performing a separate process for sintering. Since a thermosetting temperature of the conductive resin layer may be generally 150 to 200° C., the coating layer according to the present disclosure is not removed and may thus remain during a process of forming the conductive resin layer.

Therefore, the coating layer may serve to improve adhesion force between the conductive resin layer and the ceramic body.

In further detail, the coating layer according to the present disclosure may contain silicon, thereby significantly improving adhesion force. 0.5 to 45 parts by mole of silicon may be contained in the coating layer, based on 100 parts by mole of fluorine.

Since fluorine is a Group 17 element and may only have a single bond, in the case in which fluorine is bound to the surface of the ceramic body, it may be difficult to be additionally bound to the conductive resin layer. However, since silicon is a Group 14 element, silicon may have four covalent bonds and be covalently bound to all of elements contained in the ceramic body and the conductive resin layer, such that adhesion force between the ceramic body and conductive resin layer may be strengthened.

In the case of coating a ceramic body using only a fluorine compound and forming an external electrode (corresponding to the electrode layer in the present disclosure) as disclosed in Patent Document 1, since silicon is not contained, adhesion force between the ceramic body and the external electrode may not be strengthened. Further, in the case of Patent Document 1, regardless of whether or not silicon is contained, a majority of the coated fluorine compound is removed by thermal treatment during a process of sintering the external electrode. Thus, it may be difficult to improve adhesion force.

The case in which a surface of an electronic part is surface-treated with silicon is disclosed in Patent Document 2, but the case in which both of fluorine and silicon are used is not disclosed therein.

In detail, the case in which coating is performed using fluorine is disclosed in Patent Document 1, and the case in which coating (surface treatment) is performed using silicon is disclosed in Patent Document 2, but a method of coating the surface of the ceramic body using both of fluorine and silicon is not disclosed therein. Further, an effect of improving adhesion force between a conductive resin layer and a ceramic body is not disclosed nor intimated in both of Patent Documents 1 and 2.

For example, according to the exemplary embodiment of the present disclosure, a flow of the conductive resin paste may be controlled during the process of forming the conductive resin layer simultaneously with improving adhesion force between the ceramic body 110 and the conductive resin layers 131$b$ and 132$b$, and the bandwidth of the conductive resin layer may be formed to be uniform by coating the surface of the ceramic body using both of silicon and fluorine, disposing the coating layer 140 between the surface of the ceramic body 110 and the conductive resin layers 131$b$ and 132$b$, and preventing the removal of the coating layer 140 during the process of forming the conductive resin layers 131$b$ and 132$b$.

In the case of coating a surface of a ceramic body using only a fluorine compound and then forming an conductive resin layer as disclosed in Patent Document 1, a phenomenon in which the conductive resin layer is detached may occur, but in the case of coating a surface of a ceramic body using fluorine and silicon and then forming a conductive resin layer as in the present disclosure, adhesion force may be improved, such that a phenomenon in which the ceramic body and the external electrode are detached from each other may be prevented.

In detail, in the case in which 0.5 to 45 parts by mole of silicon is contained, based on 100 parts by mole of fluorine, the flow of the conductive resin paste may be controlled, such that the non-uniformity phenomenon of the band width in the conductive resin layer may be significantly prevented, and adhesion force between the ceramic body and the conductive resin layer may be significantly improved.

The plating layers 131$c$, 132$c$, 131$d$, and 132$d$ may be disposed on the conductive resin layers 131$b$ and 132$b$. For example, the plating layer may be disposed on an outer portion of the conductive resin layer.

In the present specification, a direction in which the ceramic body 110 is present is referred to an inner direction of the electrode layer and the conductive resin layer, and a direction in which the ceramic body 110 is not present is referred to an outer direction of the electrode layer and the conductive resin layer.

The plating layer is disposed on the outer portion of the conductive resin layer, which may include the case in which another configuration may be disposed between the conductive resin layer and the plating layer as well as the case in which the conductive resin layer and the plating layer directly contact each other.

According to an exemplary embodiment of the present disclosure, the multilayer ceramic capacitor capable of decreasing a nonuniformity phenomenon of the conductive resin layer and a detachment phenomenon of a conductive resin layer by forming the coating layer containing fluorine and silicon may be provided.

Method of Manufacturing Multilayer Ceramic Capacitor

Figure 4:
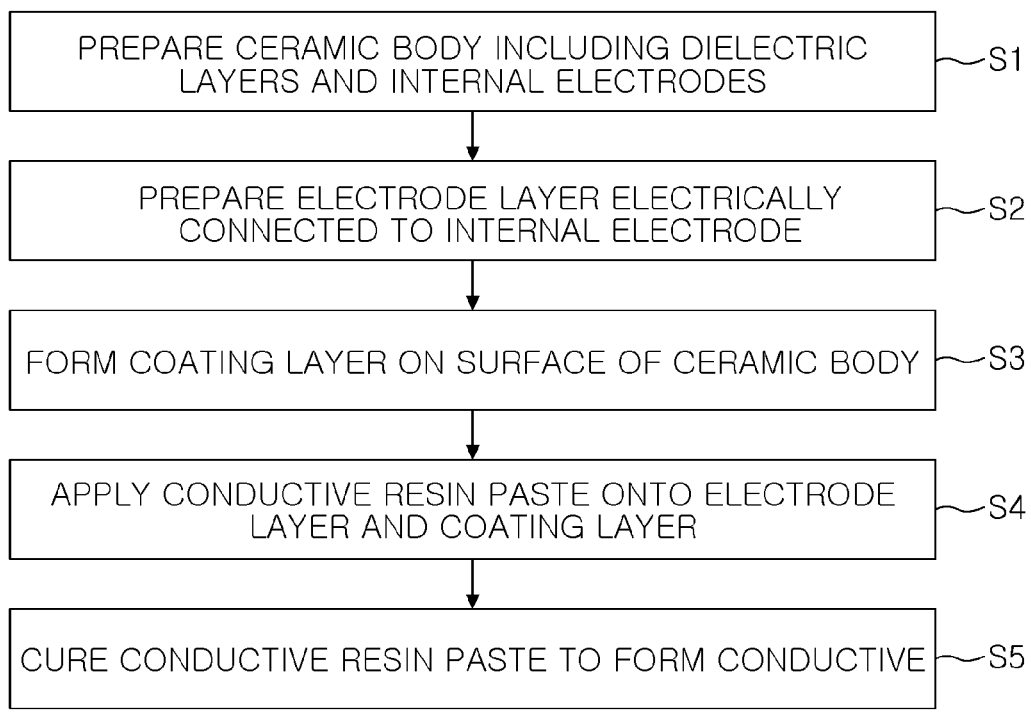
FIG. 4 is a flow chart illustrating a method of manufacturing a multilayer ceramic capacitor according to another exemplary embodiment of the present disclosure.

FIG. 4 is a manufacturing process chart showing a process of manufacturing a multilayer ceramic capacitor according to another exemplary embodiment of the present disclosure.

Referring to FIG. 4, the method of manufacturing a multilayer ceramic capacitor according this exemplary embodiment may include: preparing a ceramic body including dielectric layers and internal electrodes (S1); preparing an electrode layer electrically connected to the internal electrode (S2); forming a coating layer on a surface of the ceramic body (S3); applying a conductive resin paste to the electrode layer and the coating layer (S4); and curing the conductive resin paste to form a conductive resin layer (S5).

Hereinafter, the method of manufacturing a multilayer ceramic capacitor according to an exemplary embodiment of the present disclosure will be described, but is not limited thereto.

In addition, among descriptions of the method of manufacturing a multilayer ceramic capacitor according to this exemplary embodiment, a description overlapped with that of the above-mentioned multilayer ceramic capacitor will be omitted.

In the method of manufacturing a multilayer ceramic capacitor according to an exemplary embodiment of the present disclosure, first, slurry containing powder such as barium titanate ($BaTiO_3$) powder, or the like, may be applied to a carrier film to then be dried to prepare a plurality of ceramic green sheets, thereby forming a dielectric layer and a cover layer.

The ceramic green sheet may be manufactured by mixing the ceramic powder, a binder, and a solvent to prepare the slurry and manufacturing the prepared slurry as a sheet having a thickness of several μm by a doctor blade method.

Next, a conductive paste for an internal electrode containing nickel powder may be prepared.

After the conductive paste for an internal electrode is applied to the green sheet by a screen printing method to form the internal electrode, a plurality of green sheets on which the internal electrode is printed may be stacked, and a plurality of green sheets on which the internal electrode is not printed may be stacked on upper and lower surfaces of this multilayer body, followed by sintering, thereby manufacturing the ceramic body 110. The ceramic body may include internal electrodes 121 and 122, the dielectric layers 111, and the cover layer. The dielectric layer is formed by sintering the green sheet on which the internal electrode is printed, and the cover layer is formed by sintering the green sheet on which the internal electrode is not printed.

The internal electrode may include the first and second internal electrodes.

The first and second electrode layers 131a and 132a may be formed on outer surfaces of the ceramic body so as to be electrically connected to the first and second internal electrodes, respectively. The first and second electrode layers may be formed by sintering a paste containing a conductive metal and glass.

The conductive metal is not particularly limited, but may be, for example, one or more selected from a group consisting of copper (Cu), silver (Ag), nickel (Ni), and alloys thereof.

The glass is not particularly limited, but may be a material having the same composition as that of glass used to form an external electrode of a general multilayer ceramic capacitor.

A coating layer 140 may be formed on the surface of the ceramic body on which the first and second electrode layers 131a and 132a are formed, using a plasma coating technology.

Plasma is referred to as "the fourth state of matter" distinct from a solid, a liquid, and a gas. When a temperature of a material in a gas state is raised by continuously applying heat thereto, aggregates of particles composed of ion nuclei and free electrons are formed. A material in the above-mentioned state is referred to as plasma.

The plasma technology may be used in a process of modifying a new material or surface unable to be processed by an existing method.

A plasma coating process may include a plasma treating process and a plasma polymerization process.

A thin and dense film may be formed on a surface of an object by plasma polymerization, such that a contact with water may be significantly decreased. The plasma polymerization as described above may be used to modify the surface of the object.

In the case of plasma polymerization, an injected monomer may form a radical by electric discharge, and this radical may directly form a thin and uniform film on a surface of a metal.

In this exemplary embodiment, as the monomer, $C_3F_6$ and $SiF_4$ gases may be used. The coating layer may be formed on the surface of the ceramic body 110 through the plasma polymerizing process, and the surface of the ceramic body 110 may be hydrophobic due to this coating layer.

Then, a conductive resin composition containing conductive powder may be applied to outer portions of the first and second electrode layers to then be cured, thereby forming conductive resin layers 131b and 132b. The conductive resin composition may contain the conductive powder and a base resin, and the base resin may be an epoxy resin, a thermosetting resin.

The conductive resin layers 131b and 132b may extend to cover the first and second electrode layers and portions of outer surfaces of the ceramic body, adjacent to the first and second electrode layers, to be greater in width, as compared to a formation position of the first and second electrode layers on outer surfaces of the ceramic body. Thus, even in the case of applying a conductive resin paste, a flowability of the conductive resin paste may be controlled by the coating layer formed in advance, such that the conductive resin paste may have a uniform flow and may be cured while being maintained to have a shape of the applied conductive resin paste.

The method of manufacturing a multilayer ceramic capacitor according to the present disclosure may further include forming nickel plating layers 131c and 132c and tin plating layers 131d and 132d after forming the conductive resin layers 131b and 132b.

Experimental Example

The following Table 1 shows results obtained by testing whether or not a non-uniformity phenomenon of a band width of a conductive resin layer, a tombstone defect, and a conductive resin layer detachment phenomenon occur according to contents of fluorine and silicon contained in a coating layer. An experiment was performed using a 1608 size capacitor having capacitance of 100 nF. In order to evaluate a non-uniformity phenomenon of the bandwidth of the conductive resin layer, as shown in FIG. 3, a minimum value of a ratio (a/a') of a total band width a to a band width a' in 100 capacitors according to the exemplary embodiment was measured, and a difference between the measured value and 1 was represented as a severe extent to which a non-uniformity phenomenon of the band width occurred. In order to evaluate a tombstone defect, among 500 capacitors, the number of capacitors in which tombstone defect occurred after a reflow process was confirmed, and a detachment phenomenon of the conductive resin layer was evaluated by confirming whether or not the conductive resin layer was apparently detached after repeating attachment and detachment of a tape to and from a surface of an external electrode, 5 times, using a tape having adhesive force of 8N (tape test).

TABLE 1

| Sample | Content (Part by Mole) of Silicon Based on 100 Parts by Mole of Fluorine | a/a' | Tombstone Defect Occurrence | Conductive Resin Layer Detachment |
|---|---|---|---|---|
| 1* | 0 | 1.01 | 0/500 | 17/200 |
| 2* | 0.2 | 1.02 | 0/500 | 12/200 |
| 3* | 0.45 | 1.01 | 0/500 | 8/200 |
| 4* | 0.48 | 1.0 | 0/500 | 4/200 |
| 5 | 0.51 | 1.01 | 0/500 | 0/200 |
| 6 | 3.5 | 1.01 | 0/500 | 0/200 |
| 7 | 12.4 | 1.02 | 0/500 | 0/200 |
| 8 | 26.7 | 1.0 | 0/500 | 0/200 |
| 9 | 36.8 | 1.02 | 0/500 | 0/200 |
| 10 | 43.5 | 1.01 | 0/500 | 0/200 |
| 11 | 44.6 | 1.02 | 0/500 | 0/200 |
| 12* | 45.2 | 1.05 | 6/500 | 0/200 |
| 13* | 47 | 1.12 | 12/500 | 0/200 |
| 14* | 54 | 1.26 | 24/500 | 0/200 |

*Comparative Example

As shown in Table 1, as a result of the tape test, in the case in which the content of silicon was less than 0.5 parts by mole, the conductive resin layer detachment phenomenon occurred, but in the case in which the content was equal to or more than 0.5 parts by mole, the detachment phenomenon did not occur. Further, it may be confirmed that in the case in which the content of the silicon was more than 45 parts by mole, the tombstone defect started to occur, and as the content of silicon was increased, the amount of capacitors in which the tombstone defect occurred was also increased.

As set forth above, according to exemplary embodiments of the present disclosure, multilayer ceramic electronic parts having uniform band widths of external electrodes may be manufactured.

Further, the occurrence of a detachment phenomenon of external electrodes may be decreased to provide multilayer ceramic electronic parts having excellent reliability.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic electronic part comprising:
a ceramic body including a plurality of dielectric layers;
a plurality of first and second internal electrodes disposed in the ceramic body to be alternately exposed to first and second end surfaces of the ceramic body, having the dielectric layer therebetween;
first and second electrode layers electrically connected to the first and second internal electrodes, respectively;
a conductive resin layer formed on the first and second electrode layers and in regions of the ceramic body adjacent to the first and second electrode layers; and
a coating layer formed between a portion of an outer surface of the ceramic body on which the conductive resin layer is to be formed and the conductive resin layer,
wherein the coating layer contains silicon and fluorine, and
wherein the coating layer contains 0.5 to 45 parts by mole of the silicon, based on 100 parts by mole of the fluorine.

2. The multilayer ceramic electronic part of claim 1, wherein the coating layer contains a compound containing silicon and fluorine.

3. The multilayer ceramic electronic part of claim 1, wherein the coating layer contains at least one of silicon or silicon compounds and at least one of fluorine or fluorine compounds.

4. The multilayer ceramic electronic part of claim 1, wherein the conductive resin layer contains a conductive metal and a thermosetting resin.

5. The multilayer ceramic electronic part of claim 4, wherein the thermosetting resin includes an epoxy resin.

6. A multilayer ceramic electronic part comprising:
a ceramic body including dielectric layers and internal electrodes;
an electrode layer electrically connected to the internal electrode;
a surface energy decreasing layer formed on a surface of the ceramic body; and
a conductive resin layer formed on the electrode layer and the surface energy deceasing layer,
wherein the surface energy decreasing layer contains silicon and fluorine, and
wherein the surface energy decreasing layer contains 0.5 to 45 parts by mole of the silicon, based on 100 parts by mole of the fluorine.

7. A method of manufacturing a multilayer ceramic electronic part, the method comprising:
preparing a ceramic body including dielectric layers and internal electrodes;
preparing an electrode layer electrically connected to the internal electrode;
forming a coating layer on a surface of the ceramic body;
applying a conductive resin paste to the electrode layer and the coating layer; and
curing the conductive resin paste to form a conductive resin layer,
wherein the coating layer contains silicon and fluorine, and
wherein the coating layer contains 0.5 to 45 parts by mole of the silicon, based on 100 parts by mole of the fluorine.

8. The method of claim 7, wherein the coating layer is coated on the surface of the ceramic body by a plasma coating process.

9. The method of claim 8, wherein the plasma coating process includes a plasma treating process and a plasma polymerization process.

10. The method of claim 7, wherein the conductive resin layer contains a conductive metal and a thermosetting resin.

11. The method of claim 10, wherein the thermosetting resin includes an epoxy resin.

12. The method of claim 7, wherein the conductive resin layer is formed by curing the conductive resin paste at a temperature lower than 300° C.

* * * * *